United States Patent
San Martin et al.

(10) Patent No.: US 11,747,507 B2
(45) Date of Patent: Sep. 5, 2023

(54) ADJUSTABLE FREQUENCY PROCESSING OF ELECTROMAGNETIC LOGGING DATA

(71) Applicant: Halliburton Energy Services, Inc., Houston, TX (US)

(72) Inventors: Luis Emilio San Martin, Houston, TX (US); Reza Khalaj Amineh, Houston, TX (US); Burkay Donderici, Pittsford, NY (US)

(73) Assignee: Halliburton Energy Services, Inc., Houston, TX (US)

(*) Notice: Subject to any disclaimer, the term of this patent is extended or adjusted under 35 U.S.C. 154(b) by 1114 days.

(21) Appl. No.: 16/097,441

(22) PCT Filed: Jul. 1, 2016

(86) PCT No.: PCT/US2016/040701
§ 371 (c)(1),
(2) Date: Oct. 29, 2018

(87) PCT Pub. No.: WO2018/004658
PCT Pub. Date: Jan. 4, 2018

(65) Prior Publication Data
US 2019/0137649 A1    May 9, 2019

(51) Int. Cl.
*G01V 3/38* (2006.01)
*G01V 3/28* (2006.01)
(Continued)

(52) U.S. Cl.
CPC .............. *G01V 3/38* (2013.01); *E21B 47/13* (2020.05); *G01V 3/28* (2013.01); *G01V 3/30* (2013.01);
(Continued)

(58) Field of Classification Search
CPC ... G01V 3/38; G01V 3/28; G01V 3/30; G01V 3/34; G01V 2210/22; G01V 2210/6163; E21B 47/13
See application file for complete search history.

(56) References Cited

U.S. PATENT DOCUMENTS

| 4,539,847 A | 9/1985 | Paap |
| 4,573,359 A | 3/1986 | Carstensen |

(Continued)

FOREIGN PATENT DOCUMENTS

| WO | 2015053741 A1 | | 4/2015 |
| WO | WO 2015/053741 | * | 4/2015 |
| WO | WO 2015/157270 | * | 10/2015 |

OTHER PUBLICATIONS

ID Application Serial No. P00201 809495; Office Action; dated Sep. 19, 2019, 3 pages.
(Continued)

*Primary Examiner* — Arleen M Vazquez
*Assistant Examiner* — Lynda Dinh
(74) *Attorney, Agent, or Firm* — DELIZIO, PEACOCK, LEWIN, & GUERRA (57) ABSTRACT

Pipe]parameter determinations from electromagnetic logs can be improved, in accordance with various embodiments, by weighting signals with frequencies below a threshold associated with resolution degradation lower than signals with frequencies above the threshold. The threshold frequency may be determined based on a spatial resolution associated with the logging tool and a logging speed. Further embodiments are described.

21 Claims, 8 Drawing Sheets

(51) Int. Cl.
*G01V 3/30* (2006.01)
*G01V 3/34* (2006.01)
*E21B 47/13* (2012.01)

(52) U.S. Cl.
CPC ............ *G01V 3/34* (2013.01); *G01V 2210/22* (2013.01); *G01V 2210/6163* (2013.01)

(56) References Cited

U.S. PATENT DOCUMENTS

| | | | |
|---|---|---|---|
| 6,703,837 B1* | 3/2004 | Wisler | G01V 3/28 |
| | | | 324/338 |
| 6,777,940 B2* | 8/2004 | Macune | G01V 3/30 |
| | | | 324/335 |
| 6,992,594 B2 | 1/2006 | Dudley | |
| 7,626,393 B2 | 12/2009 | De Jesus et al. | |
| 7,755,354 B2* | 7/2010 | Akkurt | G01R 33/5617 |
| | | | 324/303 |
| 7,770,639 B1 | 8/2010 | Pledger | |
| 8,854,045 B2* | 10/2014 | Miles | G01V 3/38 |
| | | | 324/339 |
| 2001/0037675 A1* | 11/2001 | Kuo | G01N 17/00 |
| | | | 73/86 |
| 2004/0189289 A1 | 9/2004 | Atherton | |
| 2004/0220741 A1 | 11/2004 | Haugland | |
| 2009/0195244 A1* | 8/2009 | Mouget | G01V 3/28 |
| | | | 324/221 |
| 2010/0017137 A1* | 1/2010 | Legendre | G01B 7/13 |
| | | | 702/11 |
| 2014/0207379 A1 | 7/2014 | Bjornemo | |
| 2015/0142320 A1* | 5/2015 | Wu | G01V 3/30 |
| | | | 702/11 |

OTHER PUBLICATIONS

Kishawy, et al., "Review of pipeline integrity management practices", International Journal of Pressure Vessels and Piping, vol. 87, Issue 7, Jul. 2010, pp. 373-380.

Lee, et al., "Frequency domain analysis for detecting pipeline leaks", Journal of Hydraulic Engineering, ASCE, vol. 131 (7), pp. 596-604, 2005.

Arbuzov, et al., "Memory Magnetic Imaging Defectoscopy.", Paper presented at the SPE Russian Oil and Gas Exploration and Production Technical Conference and Exhibition, Moscow, Russia, Oct. 2012, 10 pages.

Garcia, et al., "Successful Application of a New Electromagnetic Corrosion Tool for Well Integrity Evaluation in Old Wells Completed with Reduced Diameter Tubular", Paper presented at the International Petroleum Technology Conference, Beijing, China, Mar. 2013, 12 pages.

PCT Application Serial No. PCT/US2016/040701, International Search Report, dated Mar. 23, 2017, 3 pages.

PCT Application Serial No. PCT/US2016/040701, International Written Opinion, dated Mar. 23, 2017, 8 pages.

* cited by examiner

ADJUSTABLE FREQUENCY PROCESSING OF ELECTROMAGNETIC LOGGING DATA

BACKGROUND

The integrity of metal pipes in oil and gas wells is of great importance. Perforations or cracks in production tubing due to corrosion, for example, can cause significant loss of revenue due to loss of hydrocarbons and/or production of unwanted water. The corrosion of the well casing can be an indication of a defective cement bond between the casing and the borehole wall, which is likewise of concern because it can allow uncontrolled migration of fluids between different formation zones or layers. Near the surface, uncontrolled fluid migration can cause contamination of agricultural or drinking water reserves.

To prevent damage associated with pipe (e.g., production tubing or casing) corrosion, it is good practice to periodically assess the integrity of the pipes to determine places where intervention is necessary to repair damaged sections. However, the evaluation of the integrity of pipes downhole presents a difficult problem. After pipe construction and installation in the well, there is no easy access to the pipes, and the evaluation is generally performed from the interior of the metal pipes using indirect means such as electromagnetic waves. The difficulty is exacerbated in wells with multiple concentric pipes, where the assessment is to be performed from the innermost pipe. In this case, the electromagnetic waves have to pass through several metal walls. The thicker the total thickness of the pipes to be inspected, the lower is the frequency that needs to be used to penetrate the total metal thickness. On the other hand, the lower the frequency used, the longer is the measurement interval required to accumulate a sufficient number of signal cycles. In view of this tradeoff, a versatile tool that can operate across a wide range of total thicknesses of the pipes is desirable.

DETAILED DESCRIPTION

The present disclosure relates generally to pipe inspection by electromagnetic logging in conjunction with numerical inversion of the acquired electromagnetic response to determine pipe thickness and/or other pipe parameters. More specifically, various embodiments described herein involve taking electromagnetic measurements at multiple frequencies, and determining a threshold frequency associated with spatial resolution degradation, as may be characterized in terms of the tool movement during a measurement time interval (herein in short "measurement interval") compared with the inherent spatial resolution of the tool. In processing the electromagnetic response to determine the pipe parameters, response signals with frequencies equal to or above the threshold are weighted higher than response signals with frequencies below the threshold. In some embodiments, signals with frequencies below the threshold frequency are simply discarded. In other embodiments, signals with frequencies above (or equal to) and below the threshold frequency are processed separately to yield separate respective sets of values for the pipe parameter(s), and the two sets are thereafter combined in a weighted manner, a lower weight being given to the pipe parameter values obtained by processing the signals with frequencies below the threshold. In yet other embodiments, signals with frequencies above (or equal to) and below the threshold frequency are inverted jointly, but with different, frequency-dependent weights assigned to the difference between measured and reference signals that goes into a cost function used in the inversion process. Furthermore, while many embodiments described herein refer to measurements at multiple discrete frequencies, the underlying principles are also applicable to time-domain measurements, in which the signal inherently captures a spectrum of frequencies. Here, a threshold time associated with spatial resolution degradation, corresponding to the inverse of the threshold frequency, can be determined, and in processing the time-domain signal, the signal portion up to the threshold time (which corresponds to frequencies equal to or above the threshold frequency) can receive a higher weight than the signal portion beyond the threshold time (which corresponds to frequencies below the threshold frequency). In some embodiments, adaptive frequency selections are not only conducted during signal processing, but also during signal acquisition. Additionally, other operating parameters, such as the logging speed and/or the measurement interval may be adjusted during logging, e.g., to improve signal quality and resolution.

The foregoing will be more readily understood from the following detailed description of various embodiment, in particular, when taken in conjunction with the accompanying drawings.

Figure 1:
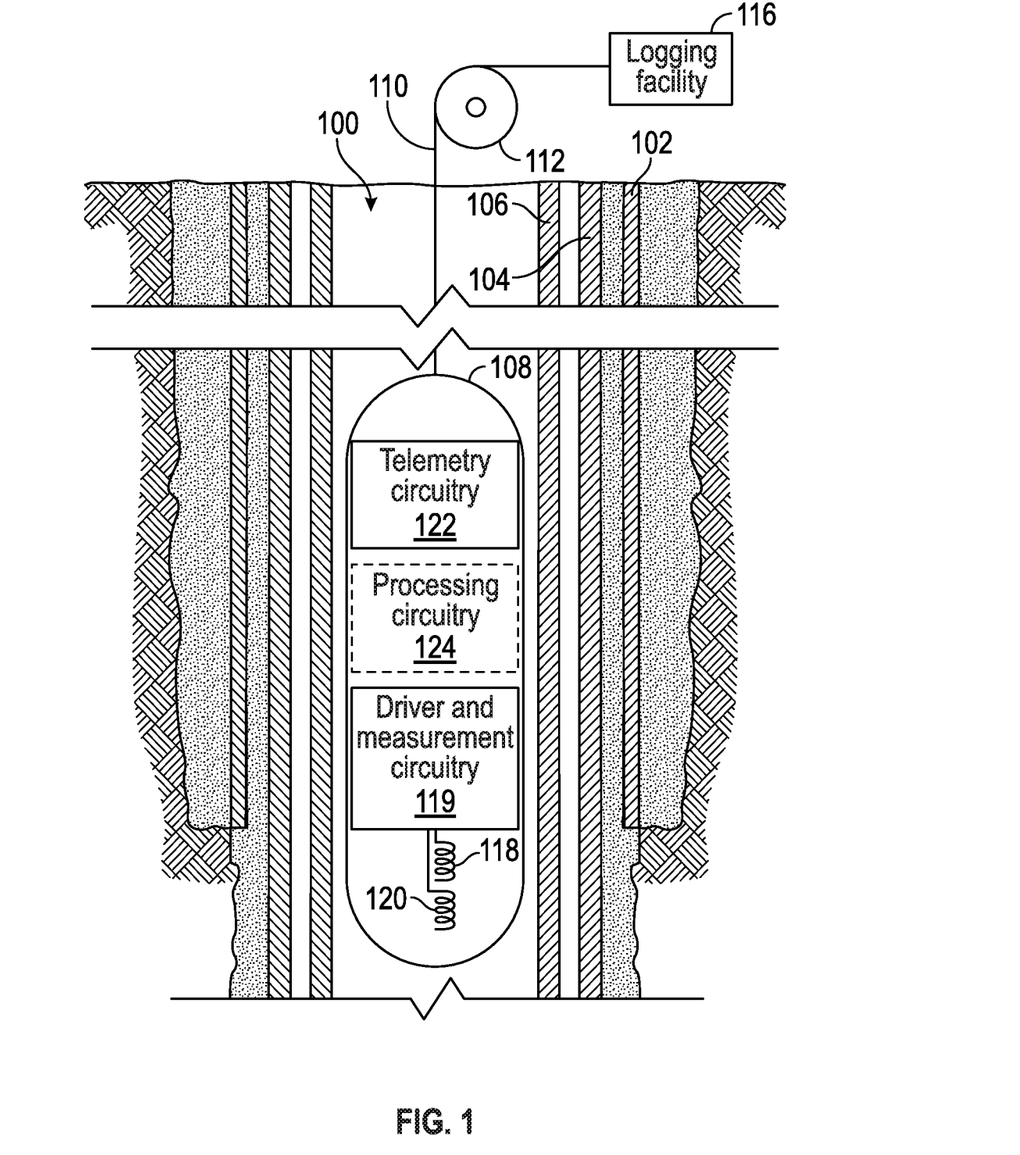
FIG. 1 is a diagram of an electromagnetic pipe inspection system deployed in an example borehole environment, in accordance with various embodiments.

FIG. 1 is a diagram of an electromagnetic pipe inspection system deployed in an example borehole environment, in accordance with various embodiments. The borehole 100 is shown during a wireline logging operation, which is carried out after drilling has been completed and the drill string has been pulled out. As depicted, the borehole 100 has been completed with surface casing 102 and intermediate casing 104, both cemented in place. Further, a production pipe 106 has been installed in the borehole 100. While three pipes 102, 104, 106 are shown in this example, the number of nested pipes may generally vary, depending, e.g., on the depth of the borehole 100. As a result, the total thickness of the pipes may also vary as a function of depth.

Wireline logging generally involves measuring physical parameters of the borehole 100 and/or surrounding formation—such as, in the instant case, the condition of the pipes 102, 104, 106—as a function of depth within the borehole 100. The pipe measurements may be made by lowering an electromagnetic logging tool 108 into the wellbore 100, for instance, on a wireline 110 wound around a winch 112 mounted on a logging truck. The wireline 110 is an electrical cable that, in addition to delivering the tool 108 downhole, may serve to provide power to the tool 108 and transmit control signals and/or data between the tool 108 and a logging facility 116 (implemented, e.g., with a suitably programmed general-purpose computer including one or more processors and memory) located above surface, e.g., inside the logging truck. In some embodiments, the tool 108 is lowered to the bottom of the region of interest and subsequently pulled upward, e.g., at substantially constant speed. During this upward trip, the tool 108 may perform measurements on the pipes, either at discrete positions at which the tool 108 halts, or continuously as the pipes pass by.

In accordance with various embodiments, the electromagnetic logging tool 108 used for pipe inspection is configured to generate, as the electromagnetic excitation signal, a time-varying primary field that induces eddy currents inside the metallic pipes, and to record, as the electromagnetic response signal, secondary fields generated from the pipes; these secondary fields bear information about the electrical properties and metal content of the pipes, and can be inverted for any corrosion or loss in metal content of the pipes. The tool 108 generally includes one or more transmitters (e.g., transmitter coil 118) that transmit the excitation signals and one or more receivers (e.g., receiver coil 120) to capture the response signals. The transmitter and receiver coils 118, 120 are usually spaced apart along the axis of the tool 108, as shown, and, thus, located at slightly different depths within the borehole 100. However, in embodiments with multiple receiver coils 120, one of the receivers may be collocated with the transmitter coil 118. In accordance with various embodiments, the tool 108 operates in the frequency domain, emitting quasi-continuous, spectrally narrow signals. The frequencies may span a wide range to facilitate inspection of pipe configurations with varying total thicknesses. For example, in some embodiments, the tool 108 can operate at frequencies as low as 0.5 Hz and as high as 1000 Hz. In various alternative embodiments, the tool 108 operates in the time domain, emitting spectrally broad pulses. Whether operating in the frequency domain or the time domain, the tool 108 further includes, associated with the transmitter(s) and receiver(s), driver and measurement circuitry 119 configured to operate the tool 108 (e.g., at any of multiple discrete frequencies, or to emit a transient pulse).

The tool 108 may further include telemetry circuitry 122 for transmitting information about the measured electromagnetic response signals (e.g., the signals themselves, or voltage levels extracted for various frequencies contained in the signals) to the logging facility 116 for processing and/or storage thereat, or memory (not shown) for storing this information downhole for subsequent data retrieval once the tool 108 has been brought back to the surface. Optionally, the tool 108 may contain analog or digital processing circuitry 124 (e.g., an embedded microcontroller executing suitable software) that allows the measured response signals to be processed at least partially downhole (e.g., prior to transmission to the surface). In any case, a log, that is, a sequence of measurements correlated with the depths along the borehole 100 at which they are taken, will be generated. The computer or other circuitry used to process the measured transient electromagnetic response signals to derive pipe parameters based thereon is hereinafter referred to as the processing facility, regardless whether it is contained within the tool 108 as processing circuitry 124, provided in a separate device such as logging facility 116, or both in part. Collectively, the electromagnetic logging tool 108 and processing facility (e.g., 124 and/or 116) are herein referred to as a pipe inspection system.

Alternatively to being conveyed downhole on a wireline, as described above, the electromagnetic logging tool 108 can be deployed using other types of conveyance, as will be readily appreciated by those of ordinary skill in the art. For example, the tool 108 may be lowered into the borehole 100 by slickline (a solid mechanical wire that generally does not enable power and signal transmission), and may include a battery or other independent power supply as well as memory to store the measurements until the tool 108 has been brought back up to the surface and the data retrieved. Alternative means of conveyance include, for example, coiled tubing or downhole tractor.

The operation of an electromagnetic logging tool (such as tool 108) in the frequency domain is generally characterized by one or more operating frequencies, a logging speed, and a measurement interval length, each of which may in principle be adjusted during the logging process, e.g., as a function of the total pipe thickness as it may vary with depth in the borehole. Setting the operating parameters of the tool involves multiple trade-offs. The selection of the operating frequencies generally depends on the total thickness of the pipes (i.e., the sum of the thicknesses of all nested pipes present at a given depth): the greater the total pipe thickness, the lower a frequency is needed to reach the outermost pipe and assess its integrity. On the other hand, the lower the frequency, the longer is the measurement interval required to accumulate a desired number of signal cycles, with higher numbers of signal cycles generally resulting in higher signal-to-noise ratios and thus, better data quality and accuracy. Longer measurement intervals, however, increase, for a given logging speed, the distance along the borehole axis across which the tool moves during one interval, which tends to decrease the spatial resolution of the measurement. Accordingly, lower frequencies generally call for smaller logging speeds to avoid resolution degradation. In general, it is desirable to run the tool as fast as possible to reduce the total time of logging. Therefore, if it is known that the total thickness of a given pipe configuration to be assessed is relatively thin (e.g., <1"), allowing relatively higher frequencies to still reach the deepest-most pipe, the speed of logging may be increased. For a given number of signal cycles per measurement interval, the trade-offs between operating frequency (and the associated thickness of pipe that can be penetrated by the electromagnetic signals), logging speed, and spatial resolution can be captured in a threshold frequency as a function of logging speed, where the threshold frequency is defined as the cut-off frequency below which the spatial resolution of the measurement is degraded due to the tool movement.

Various embodiments provide and/or utilize an electromagnetic logging tool that allows measurements across a wide range of frequencies, providing versatility to access, and optimize frequencies for, both pipe configurations with relatively thin total thickness (e.g., <1") and pipe configurations with relatively thick total thickness (e.g., >1"). The higher the frequency, the higher is the attenuation of the electromagnetic signals in the metal of the pipes. Thus, higher frequencies are usually used to probe pipe configurations with thin total thickness and lower frequencies are usually used to probe pipe configurations with thick total thickness.

For a given operating frequency, resolution degradation can be limited if the logging speed is low enough to allow for sufficient time to take a measurement at approximately the same position along the borehole. As the frequency decreases, the amount of time a measurement takes (which corresponds to the length of a measurement interval with a given number of signal cycles) increases, and, accordingly, the logging speed that ensures that the tool stays at approximately the same position during the acquisition of the measurement likewise decreases. Whether the tool "stays at approximately the same position" can be quantified, in this context, by comparing the movement of the tool with the inherent tool resolution for the given frequency and a given pipe within the pipe configuration.

For logging tools operated in the time domain, similar trade-offs as described above with respect to frequency-domain tools apply. Later portions in the time-domain response capture the contributions of the lower frequencies within the spectrum. Thus, to assess the integrity of the outermost pipes in sets of greater total pipe thickness, longer time-domain signals are generally needed. Longer time-domain signals, however, result in greater tool movement during the course of a measurement for a given logging speed, calling for smaller logging speeds to avoid resolution degradation. The trade-off can be captured, for a given inherent tool resolution, in a logging-speed-dependent time threshold that separates a signal portion up to the time threshold, throughout which the tool stays "at approximately the same position," from a signal portion for times beyond (greater than) the time threshold, which are generally affected by resolution degradation.

Figure 2:
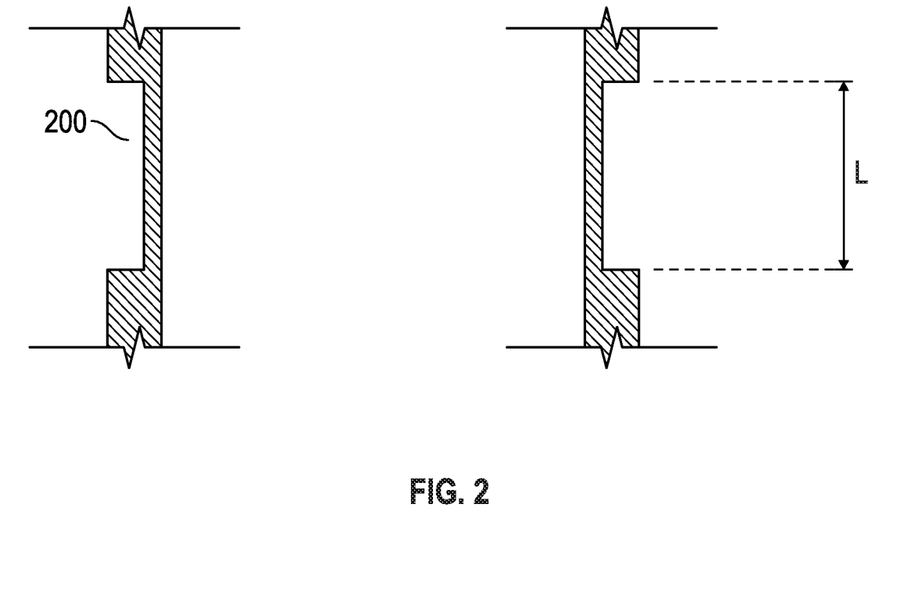
FIG. 2 is a schematic drawing of a defective pipe, illustrating the definition of spatial resolution in accordance with various embodiments.

FIG. 2 is a schematic drawing of a defective pipe, illustrating the definition of spatial resolution in accordance with various embodiments. The defect 200 is herein an azimuthally symmetric decrease in pipe thickness over a length L. Using an electromagnetic logging tool in accordance herewith in the limit of arbitrarily low logging speed, the location and length of the defect 200 can be accurately determined from the measurement down to a certain minimum length L. Below that minimum length, the tool cannot determine the true length of the defect, due to inherent limitations. Accordingly, the inherent spatial resolution of the tool is the smallest length L of a defect 200 that can still be resolved by the tool. This inherent tool resolution can be determined straightforwardly by numerical modeling, starting with a larger modeled defect and reducing the length of the modeled defect until the length as determined by the processing (e.g., deconvolution and/or numerical inversion) of the simulated measurement no longer matches the modeled defect length. As an alternative to numerical modeling and simulation, the tool resolution may also be determined empirically by using the tool to measure defects of various known lengths.

Once the inherent resolution of the tool has been determined, the maximum tool movement (i.e., distance travelled by the tool) during a measurement that is deemed consistent with "staying approximately at the same position" can be set as a certain fraction of the inherent tool resolution, the specific fraction depending on the requirements of the particular application. For example, the maximum allowable tool movement may be set at 10% or 20% of the inherent tool resolution, or at up to 100% for applications with less stringent resolution requirements. Since the tool resolution is a function of frequency and the specific pipe being assessed, so is the maximum tool movement, expressed in absolute terms (rather than relative to the tool resolution).

From the maximum tool movement in conjunction with a given measurement interval (specified e.g., in terms of a number of signal cycles for frequency-domain measurements, or taken to be the entirety of the signal for time-domain measurements), the maximum logging speed compatible with a well-resolved measurement can be calculated. As this logging speed depends on frequency-dependent quantities (the tool resolution and the measurement interval), it is itself a function of frequency. For frequency-domain measurements, the functional dependence may be inverted to determine the threshold frequency for a well-resolved measurement as a function of logging speed. At frequencies below the threshold frequency, the resolution of the measurement is degraded in the sense that tool movement exceeds the specified fraction of the inherent tool resolution, or, if the number of cycles in a measurement interval is reduced to limit resolution degradation, the measurement is affected by insufficient measurement time. Similarly, for time-domain measurements a threshold time for a well-resolved measurement can be determined as a function of logging speed; the threshold time may be taken to be the inverse of the threshold frequency. In accordance with various embodiments, the logging-speed dependent threshold frequencies or threshold times associated with the measurements are taken into consideration during processing of the measurements to remove data from frequencies or times that are affected by the movement of the tool, or use such data with lower relative weighting in the determination of pipe parameters and/or corrosion assessment.

Figure 3:
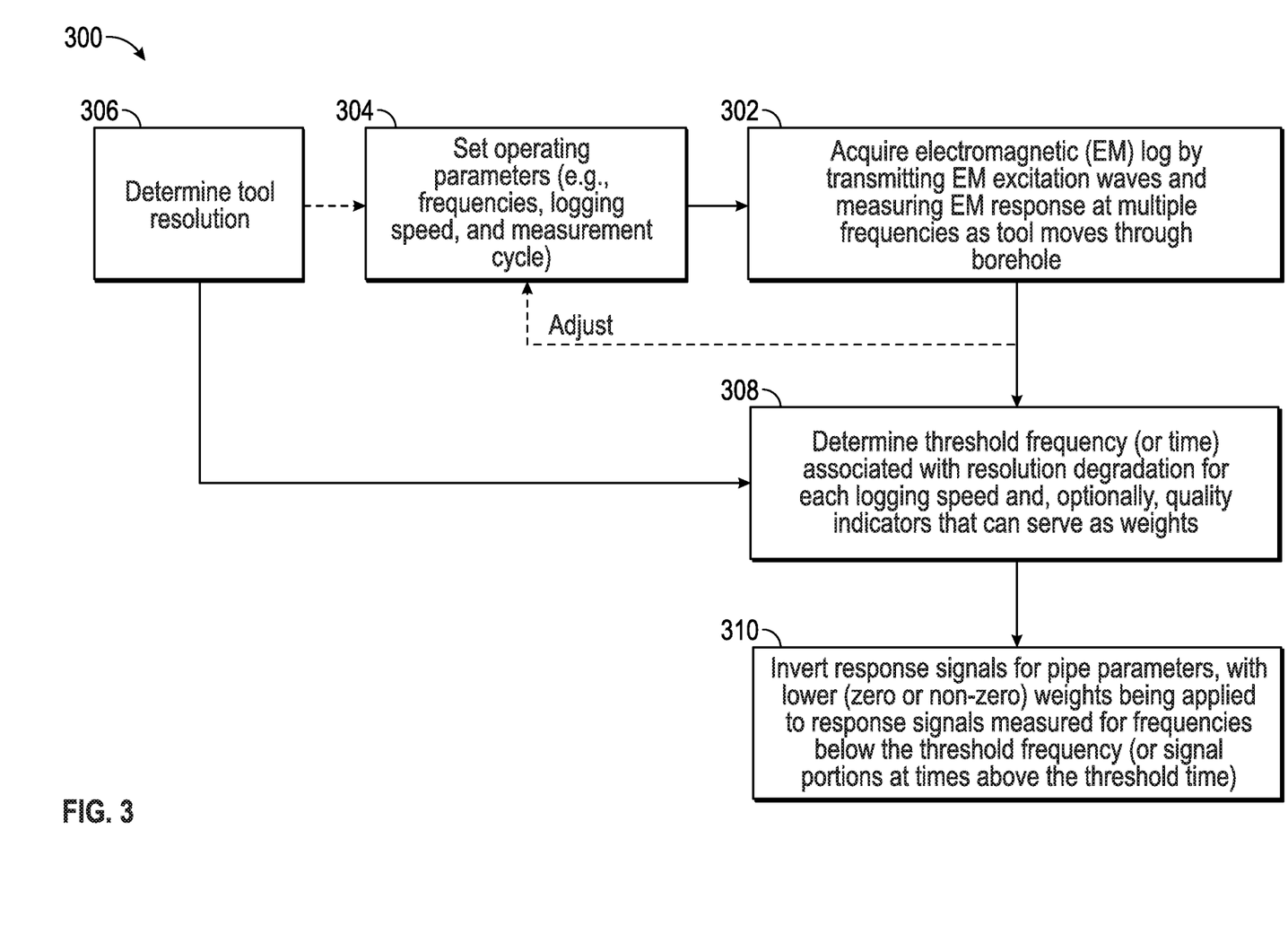
FIG. 3 is a flow chart of a method for pipe thickness determination in accordance with various embodiments.

FIG. 3 is a flow chart of a method 300 for pipe thickness determination in accordance with various embodiments. The method 300 involves using an electromagnetic logging tool (e.g., tool 108) disposed in a borehole, interior to one or more pipes, to acquire an electromagnetic log by transmitting electromagnetic excitation waves and measuring an electromagnetic response at multiple frequencies (e.g., by measuring multiple response signals at multiple respective frequencies, or by measuring a transient, time-domain response signal that inherently covers a range of frequencies) as the tool moves through the borehole (act 302). Various operating parameters, such as, e.g., the frequencies (for frequency-domain measurements), logging speed, and measurement cycle are set (act 304), and optionally adjusted during the logging process, based on, e.g., their interdependencies, the number of pipes or total nominal pipe thickness, resolution and data-quality requirements, and/or signal-to-noise ratios and sensitivities at various frequencies. For example, a set of operating frequencies may be selected based on the depth of penetration needed to reach the outermost pipe at a given borehole depth and/or, as explained below with respect to FIG. 6, based on the frequency dependence of the ratio of signal to estimated error and/or of the frequency-sensitivity of the inversion result. Further, the logging speed and/or measurement interval may be adjusted to the selected set of frequencies, e.g., to accommodate the lowest one of the frequencies without reductions in data quality and/or spatial resolution; various adjustment schemes are explained below with respect to FIGS. 5A and 5B.

The method 300 further includes determining the inherent spatial resolution of the logging tool (act 306), e.g., based on numerical modelling as described with respect to FIG. 2, and, based on the tool resolution, determining, for each logging speed used during the measurements, a threshold frequency associated with resolution degradation (or, if applicable, a corresponding threshold time) (act 308). The electromagnetic response signals measured for frequencies above the threshold frequency are then inverted, e.g., in accordance with the approach illustrated in FIG. 4, for the pipe thicknesses of the individual pipes or the total pipe thickness, or for other pipe parameters (such as, e.g., the magnetic permeability of the pipes, electrical conductivity of the pipes, or eccentricity of the pipes) (act 310). In the inversion, signals measured at frequencies below the threshold frequencies (or signal portions for times above the threshold times, corresponding to frequencies below the threshold frequencies) are used with lower weighting, or simply discarded. If used, signals with frequencies below the threshold frequency (or signal portions above the threshold time) are, in some embodiments, processed separately from signals with frequencies above the threshold frequency, and resulting pipe parameter values are combined in a weighted manner, lower weights being applied to the results of processing the signals having frequencies below the threshold. Alternatively, in other embodiments, the signals (or signal portions) below and above the threshold frequency (or threshold time) are processed jointly, with lower weights being used for the signals below the threshold frequency (above the threshold time). The weights may be or depend on quality indicators quantifying the degree of resolution degradation at frequencies below the threshold frequency, or on data-quality reduction in cases where the measurement interval is shortened to avoid or reduce resolution degradation, as may be determined along with the threshold frequency in act 308.

Figure 4:
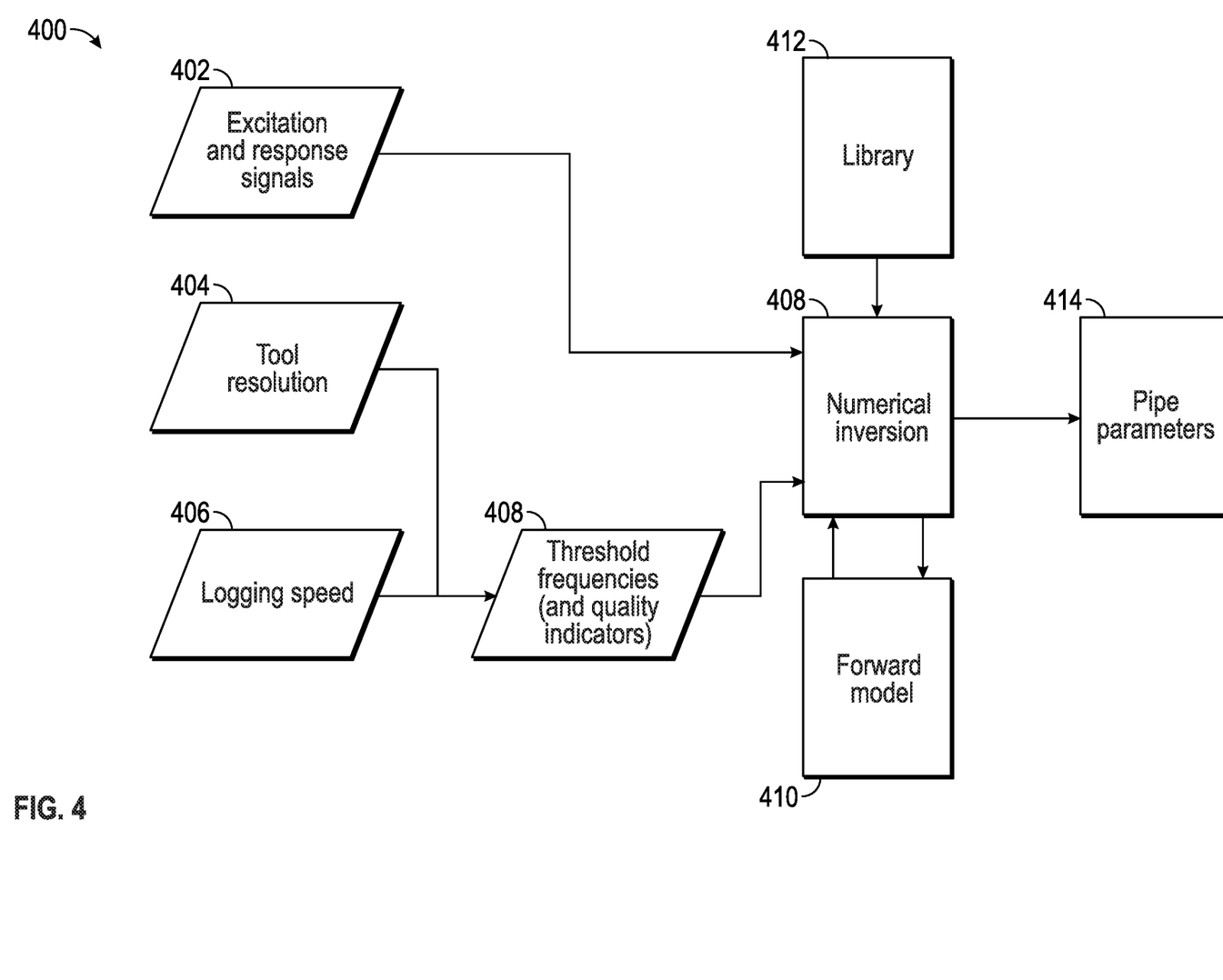
FIG. 4 is a diagram of a numerical inversion technique in accordance with various embodiments.

FIG. 4 is a diagram of a numerical inversion technique 400 in accordance with various embodiments. The relation between logging speed and lowest frequency with a sufficient number of cycles per measurement interval for high-quality processing without resolution degradation is incorporated in the processing and inversion of the tool data. Accordingly, the input for the inversion process includes the excitation signals and measured response signals 402, as well as the tool resolution 404 and logging speed(s) 405 at which the tool was run during the measurements and/or the threshold frequencies 406 (and, if applicable quality indicators) derived from the tool resolution 404 and logging speed(S) 405. As a preparatory step prior to the actual inversion the signals may be preprocessed in accordance with techniques well-known in the art of electromagnetic well logging, e.g., without limitation, by filtering to reduce noise, averaging data across multiple sensors to reduce noise, taking the difference or the ratio of multiple signal voltages to remove unwanted effects such as a common voltage drift due to temperature, employing other temperature correction schemes (e.g., involving use of a temperature correction table); calibrating to known or expected parameter values from an existing well log, and/or using array processing (also referred to as software focusing) of the data to achieve different depths of detection or vertical/azimuthal resolution. During these preprocessing steps, as during the actual inversion, frequencies below the threshold frequency are not mixed with frequencies equal to or above the threshold, in various embodiments, to avoid degradation in the resolution of the measurements.

During the inversion itself (indicated at 408), the measured response signals are compared to reference response signals either computed by forward modeling (indicated at 410) using the excitation signals as input, or looked up in a library 412 storing precomputed or experimentally determined reference response signals for various excitation signals. The forward model 410 includes a numerical model of the pipes, with adjustable pipe parameters (such as adjustable pipe thicknesses). Similarly, the construction of the library 412 is based on a numerical model of the pipes, and the library 412 includes reference response signals for different values of the pipe parameters. The pipe parameters 414 can thus be determined by solving an iterative numerical optimization problem that tries to minimize the difference between the measured response signals and the reference response signals, e.g., as captured in a cost function of the difference between measured and reference response signals. In accordance with various embodiments, pipe parameters are determined sequentially, beginning with the innermost pipe. In the inversion operations, frequencies above and below the threshold frequency (or, for time-domain signals, signal portions below and above the threshold time) may be separated out, and signals with frequencies below the threshold frequency (or signal portions for times above the threshold time) may either be used with lower weights determined based on the quality indicators associated with respective frequencies, or not at all (i.e., with weights equal to zero). Alternatively the inversion may involve minimizing a cost function that includes differences between measured and reference response signals for all measured frequencies (or times), but uses the difference associated with frequencies below the threshold with a lower weighting.

In addition to adjusting the signal processing based on the signal frequencies (or times) in relation to a logging-speed-dependent frequency (or time) threshold associated with resolution degradation, various embodiments also involve the adjustment of operating parameters during signal acquisition, as mentioned above, or the effective adjustment of operating parameters during processing. For example, the measurement interval may be adjusted based on the logging speed to avoid resolution degradation, or signals may be accumulated across constant measurement intervals during processing to achieve sufficient numbers of cycles for lower frequencies. These and other adjustment schemes are discussed in the following with reference to FIGS. 5A-6.

Figure 5A:
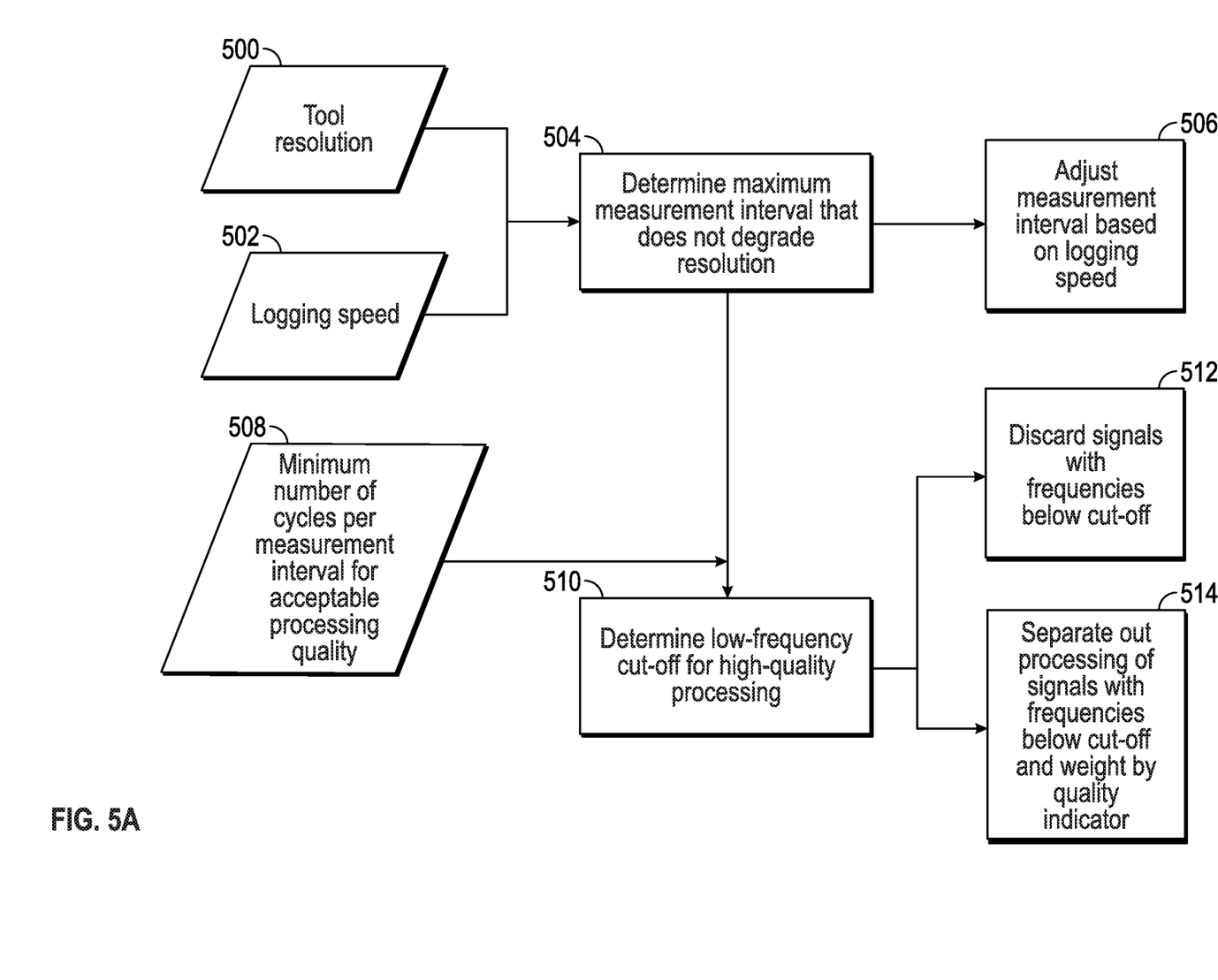
FIG. 5A is a diagram of a scheme for adjusting a measurement interval based on the logging speed, in accordance with various embodiments.
Figure 5B:
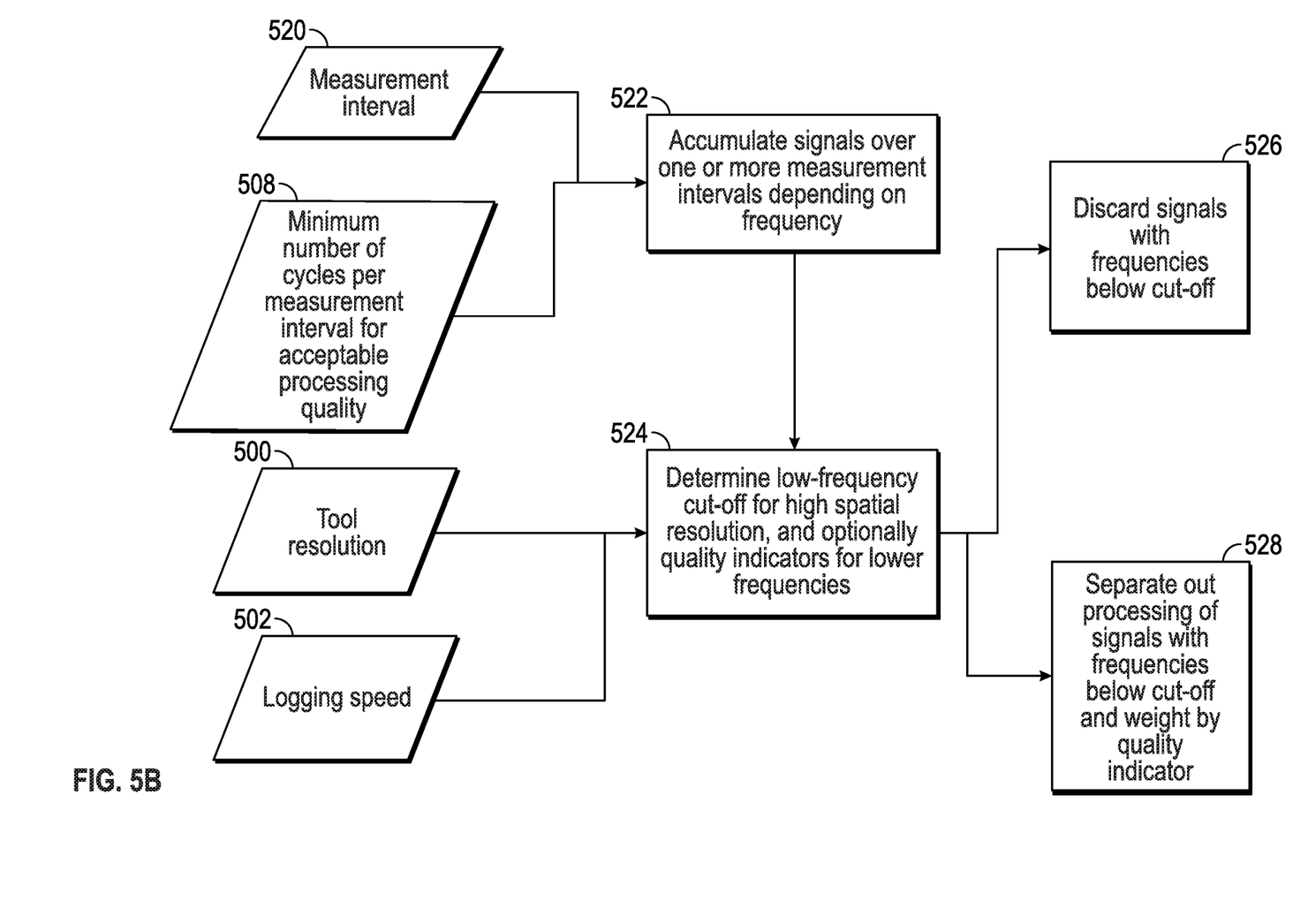
FIG. 5B is a diagram of a scheme for accumulating signals across measurement intervals at low frequencies, in accordance with various embodiments.

FIG. 5A is a diagram of a scheme for adjusting a measurement interval based on the logging speed, in accordance with various embodiments. An underlying assumption is that the length of the measurement interval can be changed during the measurement to account for changes in the logging speed. The adjustment scheme involves determining, based on the inherent resolution of the tool 500 and the logging speed 502, the maximum measurement interval that does not result in resolution degradation in the manner defined above (i.e., the longest measurement interval that does not cause movement of the tool during a measurement interval by more than the specified fraction, e.g., 10% of the tool resolution) (act 504). If the current measurement interval exceeds the determined maximum, e.g., following an increase in the logging speed, the measurement interval can be reset to the maximum (act 506). Conversely, if the current measurement falls below the determined maximum, e.g., as a result of a decrease in the logging speed, the measurement interval can be increased up to the maximum to allow accumulation of more signal cycles for better measurement quality. Given the thus adjusted measurement interval and a specified minimum number of signal cycles per measurement for acceptable measurement quality 508, a low-frequency cut-off for high measurement quality, or, in other words, a frequency threshold below which the measurement quality is degraded due to insufficient measurement cycles, can be determined (act 510). Signals below this threshold associated with quality degradation may be discarded (act 512), or processed separately from signals with frequencies above the threshold and weighted by a quality indicator (act 514).

FIG. 5B is a diagram of a scheme for accumulating signals across measurement intervals at low frequencies, in accordance with various embodiments. This scheme provides an alternative to that of FIG. 5A, applicable in cases where the measurement interval 520 itself is fixed. In order to achieve the minimum specified minimum number of signal cycles per measurement for acceptable measurement quality 508, signal samples are accumulated over one or more of the measurement intervals, depending on frequency (act 522); this effectively results in an adjustable processing interval. In this case signals with lower frequencies have a lower associated spatial resolution if the distance traveled by the tool over the number of cycles accumulated is significant compared with the inherent spatial resolution of the tool. At a certain frequency, the distance travelled by the tool over the processing interval exceeds a specified acceptable fraction of the tool resolution (e.g., 10%), corresponding to a low-frequency cut-off for high-resolution processing or, put differently, a threshold frequency associated with resolution degradation. This frequency cutoff can be determined from the frequency-dependent processing interval in conjunction with a maximum acceptable processing interval computed from the tool resolution 500 and logging speed 502 (act 524). For frequencies below the cut-off, quality indicators quantifying the degree of resolution degradation can be determined. In processing the measured signals, signals with frequencies below the threshold frequency associated with resolution degradation may be discarded (act 526), or used with the knowledge, reflected in the quality indicators, that they have lower resolution (act 528). The quality indicators may be used as weighting factors in combining the results of processing signals with frequencies above and below the threshold frequency, respectively, so as to avoid degrading the overall processing quality.

In some embodiments, the logging speed is adjusted during measurements. For example, it may be convenient to log slower in a specific section to get improved data quality and signals at additional frequencies without resolution degradation in the processing. Sections that may call for decreased logging speed include, in particular, those associated with a large total pipe thickness (e.g., the upper sections of a borehole, where the largest number of nested pipes may be present). In cases involving variable logging speed, use of the logging speed and associated threshold frequencies and quality indicators as inputs to the processing and inversion may automatically ascertain all the usable frequencies to determine the unknown parameters of the multiple pipes in the configuration, producing optimal processing results.

In some embodiments, the frequencies at which measurements are taken are adjusted during the logging process. For example, to measure sections with higher total pipe thickness, lower frequencies may be added to the set of operating frequencies. Frequency selection may also be based on the frequency dependence of signal-to-error ratios (where the error includes the noise and the part of the voltage caused by the motion of the tool in the presence of the pipe's static field), the frequencies for which the signal sensitivity to changes in the pipe thickness is maximized or, conversely, the frequencies of signals to which the conversion result (e.g., the determined pipe parameter(s)) is particularly sensitive.

Figure 6:
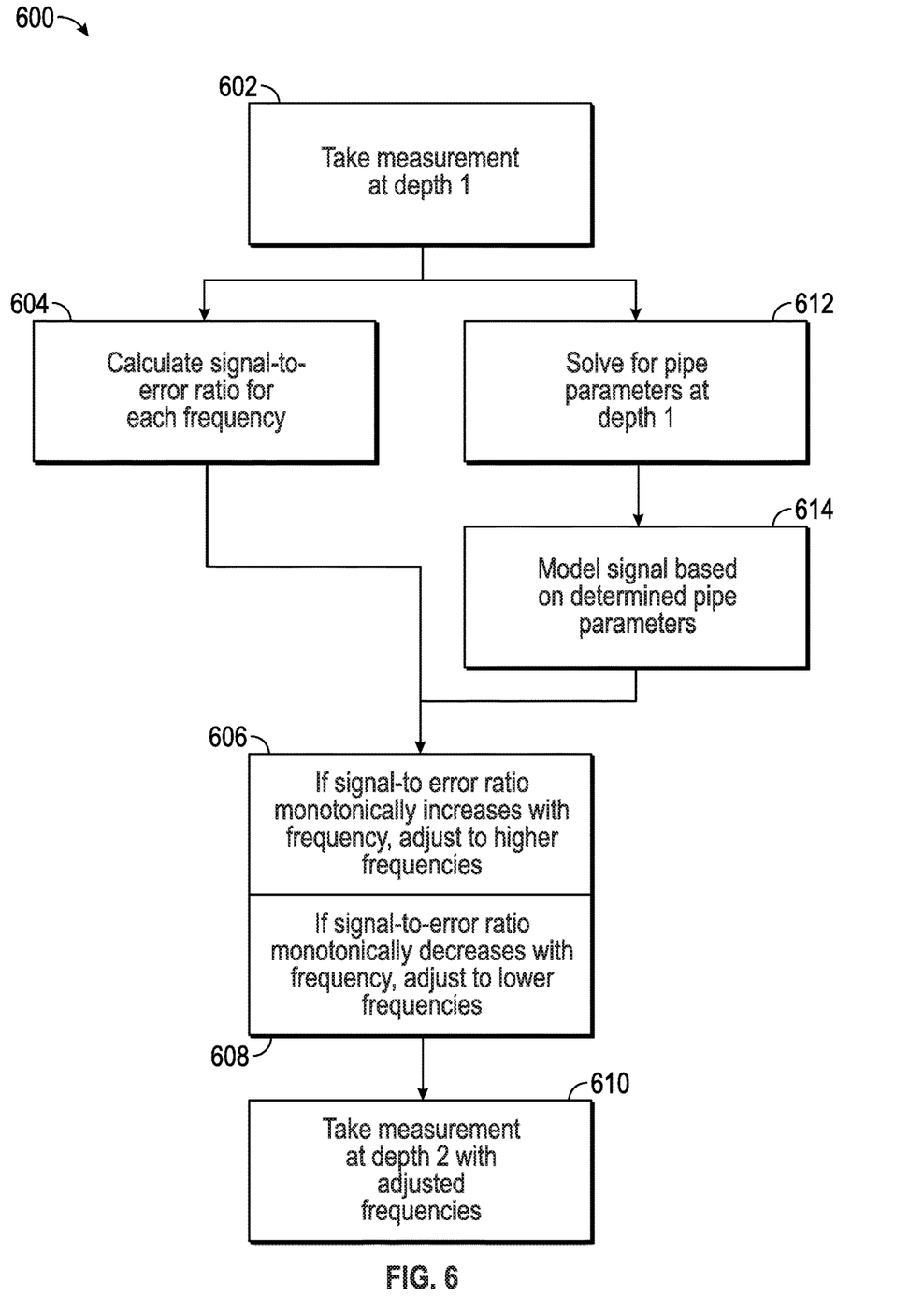
FIG. 6 is a flow chart of a method for adjusting operating frequencies based on signal-to-error ratios, in accordance with various embodiments.

FIG. 6 is a flow chart of methods 600 for adjusting operating frequencies based on signal-to-error ratios, in accordance with various embodiments. The methods generally involve taking a measurement at a first depth (act 602), and then adjusting the frequency used at a second depth based on the measurements at the first depth. In one embodiment, the signals acquired for various frequencies at the first depth are processed to calculate a ratio of the signal to the total estimated error for each frequency (act 604). The error flowing into this ratio may be due to noise in the measurement circuit, insufficient numbers of measurement cycles, resolution degradation, and/or eccentricity effects, and the signal may be affected, e.g., by the amount of Eddy currents generated, the attenuation in the pipes, and/or the impedance of the transmitter and receiver(s). If the signal-to-error ratio is found to locally increase with frequency, the operating frequencies are adjusted to higher values (act 606). If the signal-to-error ratio is found to locally decrease with frequency, the operating frequencies are adjusted to lower values (act 608). Measurements at the second depth are then taken at the adjusted set of operating frequencies (act 610). In an alternative embodiment, the measurements taken at the first depth (in act 602) are processed to solve for the pipe parameters at that depth (act 612), which then flow into the modelling and simulation of signals for additional frequencies (act 614), for which associated signal-to-error ratios can be obtained to determine if more frequencies are necessary to improve the signal-to-error ratio. The frequencies to be used for measurements at the second depth (in act 610) are adjusted upward (act 606) or downward (act 608) depending on whether the signal-to-error ratio increases or decreases with frequency.

In some embodiments, frequencies can be selected based on the sensitivity of the signal to variations in the pipe thickness for various frequencies. The frequency-dependent sensitivity may be determined, e.g., using suitable planner software, through modeling conducted around the nominal pipe thicknesses for a given well plan. For each section of pipe characterized by a fixed number of pipe and fixed nominal total pipe thickness, a set of suitable frequencies may be determined. During logging, the transitions between the different sets of frequencies may be triggered based on the depth within the borehole. Alternatively, the transition may be based on large changes in the pipe thickness as determined from the inversion results. An inversion-driven selection of frequencies may also be based on the sensitivity of the inversion result to measurements at different frequencies, as may be estimated for varying depths, and measurements that have only a small effect on the final results can be replaced by measurements at different frequencies (e.g., in real-time or in a subsequent logging pass). Inversion may also be used to dynamically optimize the number of frequencies and use of bandwidth. Estimated errors due to logging speed, electronics noise, pipe natural variations (such as residual magnetization of the steel pipes) can be included in the inversion process.

In some embodiments, thickness determination is performed in stages: A total pipe thickness measurement performed at a low frequency is first used to check for any changes in the pipe properties. This measurement may take a shorter time compared to measurements taken for a larger set of frequencies. If the initial measurement indicates a change in pipe properties (e.g., in total pipe thickness), a full set of measurements may then be conducted. In this case, an operator can be warned with a real-time signal to slow down logging to allow for sufficient bandwidth for logging at the full set of frequencies.

As will be appreciated from the forgoing description, the approach described herein involves adaptively optimizing (in a relative, not necessarily an absolute sense) the frequency range for the processing of the data obtained by an electromagnetic logging tool. Compared with standard log-processing methods, the adaptive approach can be beneficial, e.g., in that it may allow for the automatic use of very low frequencies at low logging speeds (as is convenient, e.g., to investigate thick sections in more detail) while also providing for increased logging speed in sections where low frequencies are not needed (e.g., where the total pipe thickness is relatively thin), which reduces logging time. In other words, the adaptive method described can save time by using the fastest logging speed compatible with a well-resolved measurement of the total pipe thickness to be assessed.

Figure 7:
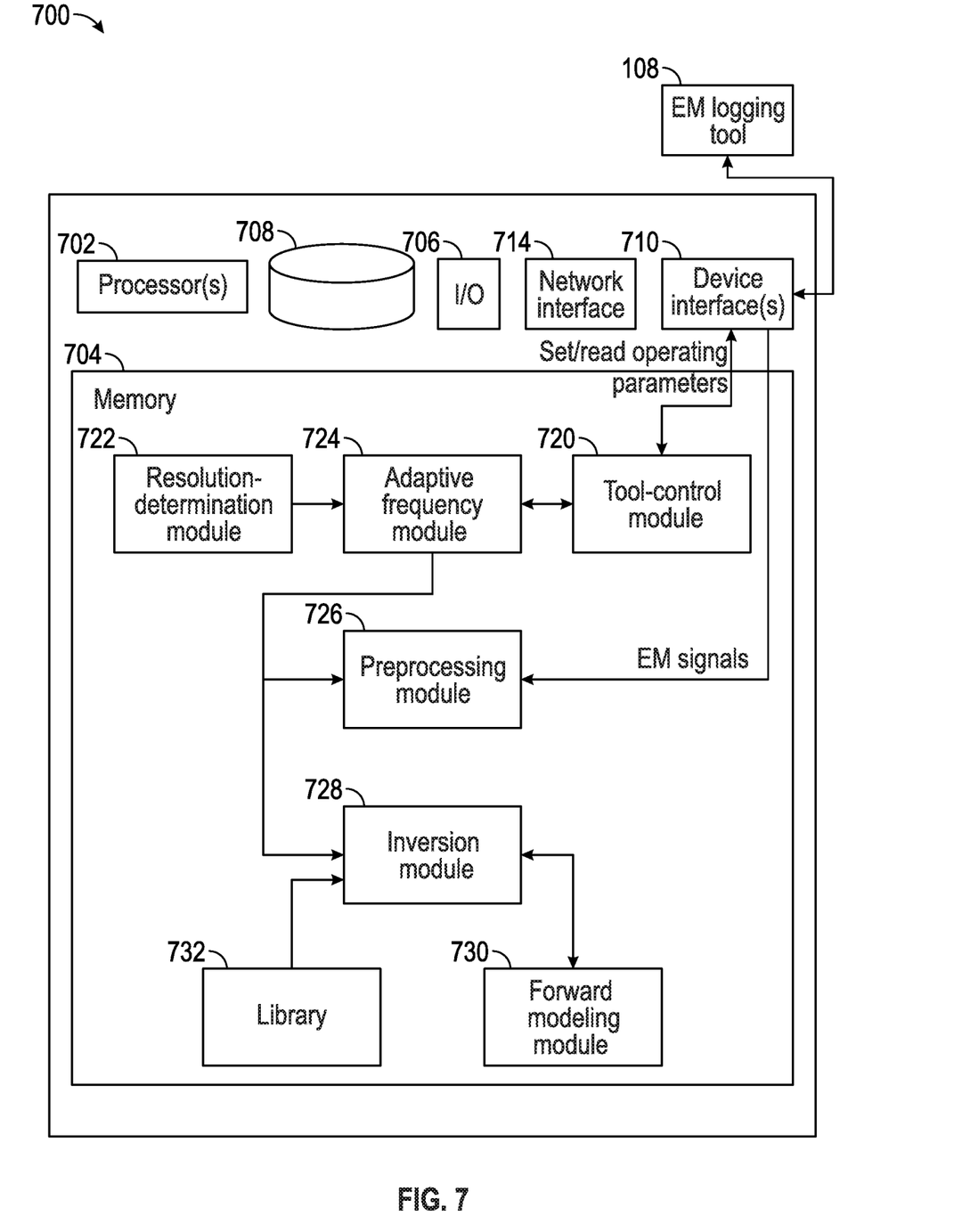
FIG. 7 is a block diagram of an example processing facility for processing electromagnetic logs using an adaptive frequency range, in accordance with various embodiments.

FIG. 7 is a block diagram of an example processing facility 700 for processing electromagnetic logs using an adaptive frequency range, in accordance with various embodiments. The processing facility 700 may be implemented, e.g., in a surface logging facility 116 or a computer communicating with the surface logging facility, or in processing circuitry 124 integrated into the electromagnetic logging tool 108. The processing facility 700 includes one or more processors 702 (e.g., a conventional central processing unit (CPU), graphical processing unit, or other) configured to execute software programs stored in memory 704 (which may be, e.g., random-access memory (RAM), read-only memory (ROM), flash memory, etc.). In some embodiments, the processing facility 700 further includes user input/output devices 706 (e.g., a screen keyboard, mouse, etc.), permanent data-storage devices 708 (including, e.g., solid-state, optical, and/or magnetic machine-readable media such as hard disks, CD-ROMs, DVD-ROMs, etc.), device interfaces 710 for communicating directly or indirectly with the electromagnetic logging tool 108, a network interface 714 that facilitates communication with other computer systems and/or data repositories, and a system bus (not shown) through which the other components of the processing facility 700 communicate. The processing facility 700 may, for example, be a general-purpose computer that has suitable software for implementing the computational methods described herein installed thereon. While shown as a single unit, the processing facility 700 may also be distributed over multiple machines connected to each other via a wired or wireless network such as a local network or the Internet.

The software programs stored in the memory 704 include processor-executable instructions for performing the methods described herein, and may be implemented in any of various programming languages, for example and without limitation, C, C++, Object C, Pascal, Basic, Fortran, Matlab, and Python. The instructions may be grouped into various functional modules. In accordance with the depicted embodiment, the modules include, for instance, a tool-control module 720, for setting/adjusting and/or reading operating parameters of the logging tool 108 (and communicating with the tool 108 via a device interface 710); a resolution-determination module 722 for simulating signals for defects of different lengths to compute the inherent spatial resolution of the tool 108; an adaptive frequency module 724 for computing, based on the tool resolution, logging speed, and/or measurement interval, the threshold frequency (or threshold time) associated with resolution degradation and optionally, quality indicators; a preprocessing module 726 for improving the signal quality prior to inversion; an inversion module 728 for determining the pipe parameters from the measured response signals; and a forward-modeling module 730 for computing reference response signals for use by the inversion module. In addition to the various computational modules, the memory 704 may also store data used by these modules, such as a library 732 of pre-computed response signals. The preprocessing and inversion modules 726, 728 may take threshold frequencies determined by the adaptive frequency module as input to process signals having frequencies that do not result in resolution degradation (beyond a specified amount) separately from signals having frequencies for which the resolution is degraded.

Of course, the computational functionality described herein can be grouped and organized in many different ways, the depicted grouping being just one example. Further, the various computational modules depicted in FIG. 7 need not all be part of the same software program or even stored on the same machine. Rather, certain groups of modules can operate independently of the others and provide data output that can be stored and subsequently provided as input to other modules. Further, as will be readily appreciated by those of ordinary skill in the art, software programs implementing the methods described herein (e.g., organized into functional modules as depicted in FIG. 7) may be stored, separately from any processing facility, in one or more non-volatile machine-readable media (such as, without limitation solid-state, optical, or magnetic storage media), from which they may be loaded into (volatile) system memory of a processing facility for execution.

In general, the processing facility carrying out the computational functionality described herein (optionally as organized into various functional modules can be implemented with any suitable combination of hardware, firmware, and/or software. For example, the processing facility may be permanently configured (e.g., with hardwired circuitry) or temporarily configured (e.g., programmed), or both in part, to implement the described functionality. A tangible entity configured, whether permanently and/or temporarily, to operate in a certain manner or to perform certain operations described herein, is herein termed a "hardware-implemented module" or "hardware module," and a hardware module using one or more processors is termed a "processor-implemented module." Hardware modules may include, for example, dedicated circuitry or logic that is permanently configured to perform certain operations, such as a field-programmable gate array (FPGA), application-specific integrated circuit (ASIC), or other special-purpose processor. A hardware module may also include programmable logic or circuitry, such as a general-purpose processor, that is temporarily configured by software to perform certain operations. Considering example embodiments in which hardware modules are temporarily configured, the hardware modules collectively implementing the described functionality need not all co-exist at the same time, but may be configured or instantiated at different times. For example, where a hardware module comprises a general-purpose processor configured by software to implement a special-purpose module, the general-purpose processor may be configured for respectively different special-purpose modules at different times.

The following numbered examples are illustrative embodiments.

1. A method comprising: using an electromagnetic logging tool disposed interior to one or more pipes, transmitting electromagnetic excitation waves and measuring an electromagnetic response at multiple frequencies; based at least in part on a logging speed and a spatial resolution associated with the logging tool and at least one of the pipes, determining a threshold frequency associated with resolution degradation; determining one or more pipe parameters of the at least one of the pipes by numerical inversion based on the electromagnetic response, a portion of the electromagnetic response corresponding to frequencies equal to or above the threshold frequency being weighted higher than a portion of the electromagnetic response corresponding to frequencies below the threshold frequency.

2. The method of example 1, wherein the measured electromagnetic response comprises multiple electromagnetic response signals at multiple respective frequencies, the portion of the electromagnetic response corresponding to frequencies equal to or above the threshold frequency being a subset of the multiple electromagnetic response signals that have frequencies equal to or above the threshold frequency.

3. The method of example 1, wherein the electromagnetic response comprises a time-domain electromagnetic response signal, the portion of the electromagnetic response corresponding to frequencies equal to or above the threshold frequency being a portion of the time-domain electromagnetic response signal ending at a threshold time equal to an inverse of the threshold frequency.

4. The method of any one of the preceding examples, wherein the measured electromagnetic response for frequencies below the threshold frequency is weighted by zero.

5. The method of any one of examples 1-3, wherein a first set of one or more pipe parameter values is determined based on the portion of the electromagnetic response corresponding to frequencies equal to or above the threshold frequency, and a second set of one or more pipe parameter values is determined separately based on the portion of the electromagnetic response corresponding to frequencies below the threshold frequency, the one or more pipe parameters being determined as a weighted combination of the first and second sets of one or more pipe parameter values, the first set being weighted higher than the second set.

6. The method of any one of examples 1-3, wherein the numerical inversion comprises minimizing a difference between the measured electromagnetic response and a reference electromagnetic response jointly for the portions corresponding to frequencies equal to or above the threshold frequency and below the threshold frequency, respectively, the difference between the measured and reference electromagnetic response for the portion corresponding to frequencies below the threshold frequency receiving a lower weight than the difference between the measured and reference electromagnetic response for the portion corresponding to frequencies equal to or above the threshold frequency.

7. The method of any one of the preceding examples, further comprising adjusting a logging speed during the transmitting and measuring based at least in part on a selected one of the multiple frequencies, the adjusting causing the threshold frequency to not exceed the selected frequency.

8. The method of example 7, wherein the threshold frequency is selected based at least in part on a total thickness of the one or more pipes at a location of the electromagnetic logging tool.

9. The method of any one of the preceding examples, wherein weights associated with the measured electromagnetic response for frequencies below the threshold frequency correspond to degrees of resolution degradation determined based in part on the spatial resolution associated with the logging tool.

10. The method of any one of the preceding examples, wherein the threshold frequency is further based on a specified minimum number of signal periods such that the electromagnetic logging tool moves by less than a specified fraction of the spatial resolution during a time period spanning the minimum number of signal periods at the threshold frequency.

11. The method of any one of the preceding examples, further comprising determining, based on the electromagnetic response acquired at a first depth of the electromagnetic logging tool within the one or more pipes, a trend of a signal-to-error ratio depending on frequency, and adjusting frequencies for measurement at a second depth based on the trend.

12. The method of example 11, wherein determining the signal-to-error ratio comprises determining the one or more pipe parameters based on the electromagnetic response acquired at the first depth, computing modelled electromagnetic response signals for a plurality of frequencies based on the one or more pipe parameters, and determining the signal-to-error ratio based on the modelled electromagnetic response signals.

13. The method of any one of the preceding examples, further comprising selecting the multiple frequencies separately for each of multiple sections of the one or more pipes.

14. The method of any one of the preceding examples, further comprising selecting the multiple frequencies based on sensitivities of the one or more pipe parameters to electromagnetic response signals at the multiple frequencies.

15. The method of any one of the preceding examples, further comprising transmitting electromagnetic excitation waves and measuring electromagnetic response signals at a single low frequency and, in response to determining a change in a total thickness of the one or more pipes from the measured low-frequency response signals, reducing the logging speed and transmitting electromagnetic excitation waves and measuring electromagnetic response signals at the multiple frequencies.

16. A system comprising: an electromagnetic logging tool for disposal interior to one or more pipes, the tool comprising at least one transmitter, at least one receiver, and associated circuitry collectively configured to transmit electromagnetic excitation waves and measure an electromagnetic response at multiple frequencies; a processing facility configured to determine, based at least in part on a logging speed and a spatial resolution associated with the logging tool and at least one of the pipes, a threshold frequency associated with resolution degradation; and determine one or more pipe parameters of the at least one of the pipes by numerical inversion based on the electromagnetic response, a portion of the electromagnetic response corresponding to frequencies equal to or above the threshold frequency being weighted higher than a portion of the electromagnetic response corresponding to frequencies below the threshold frequency.

17. The system of example 16, wherein the measured electromagnetic response comprises multiple electromagnetic response signals at multiple respective frequencies, the portion of the electromagnetic response corresponding to frequencies equal to or above the threshold frequency being a subset of the multiple electromagnetic response signals that have frequencies equal to or above the threshold frequency.

18. The system of example 16 or example 17, wherein the processing facility is configured to weight the measured electromagnetic response for frequencies below the threshold frequency by zero.

19. A tangible computer-readable medium storing: processor-executable instructions which, when executed by one or more processors, cause the one or more processors to receive electromagnetic response signals measured with an electromagnetic logging tool disposed interior to one or more pipes at multiple frequencies and associated logging-speed data; determine, based at least in part on the logging-speed data, a threshold frequency associated with resolution degradation; and determine one or more pipe parameters of the one or more pipes by numerical inversion based at least in part on one or more electromagnetic response signals, among the received electromagnetic response signals, that have frequencies equal to or above the threshold frequency, processed separately from any electromagnetic response signals having frequencies below the threshold frequency.

20. The computer-readable medium of example 19, wherein the measured electromagnetic response comprises multiple electromagnetic response signals at multiple respective frequencies, the portion of the electromagnetic response corresponding to frequencies equal to or above the threshold frequency being a subset of the multiple electromagnetic response signals that have frequencies equal to or above the threshold frequency.

Many variations may be made in the systems, tools, and methods described and illustrated herein without departing from the scope of the inventive subject matter. Accordingly, the specific embodiments and examples described are intended to be illustrative and not limiting.

What is claimed is:

1. A method for inspecting an interior of piping of a wellbore, the method comprising:
    inserting an electromagnetic logging tool into an interior of one or more pipes within the wellbore;
    setting initial operating parameters for the electromagnetic logging tool, wherein the initial operating parameters include frequencies of electromagnetic excitation waves, logging speed, and measurement cycle;
    determine a spatial resolution associated with the logging tool and at least one of the one or more pipes;
    transmitting the electromagnetic excitation waves and measuring electromagnetic response signals as the electromagnetic logging tool moves through the wellbore;
    determining a threshold frequency associated with resolution degradation according to the logging speed and spatial resolution associated with the logging tool and at least one of the one or more pipes;
    determining one or more pipe parameters of at least one of the one or more pipes by numerical inversion based on the measured electromagnetic response signals, wherein at least one of the one or more pipe parameters is a thickness of the at least one of the one or more pipes, wherein a portion of the electromagnetic response signals include frequencies equal to or above the threshold frequency being weighted higher than a portion of the electromagnetic response signals that include frequencies below the threshold frequency; and
    adjusting at least the frequencies of the electromagnetic excitation waves according to the thickness of the at least one of the one or more pipes.

2. The method of claim 1, wherein the measured electromagnetic response signals comprise multiple electromagnetic response signals at multiple respective frequencies, a portion of the measured electromagnetic response signals including frequencies equal to or above the threshold frequency being a subset of the multiple electromagnetic response signals that have frequencies equal to or above the threshold frequency.

3. The method of claim 1, wherein the measured electromagnetic response signals comprise a time-domain electromagnetic response signal, a portion of the measured electromagnetic response signals including frequencies equal to or above the threshold frequency being a portion of the time-domain electromagnetic response signal ending at a threshold time equal to an inverse of the threshold frequency.

4. The method of claim 1, wherein the measured electromagnetic response signal including frequencies below the threshold frequency is weighted by zero.

5. The method of claim 1, wherein a first set of one or more pipe parameter values is determined based on a portion of the measured electromagnetic response signals including frequencies equal to or above the threshold frequency, and a second set of one or more pipe parameter values is determined separately based on a portion of the measured electromagnetic response signals including frequencies below the threshold frequency, and wherein the first set and the second set of the one or more pipe parameters are combined as a weighted combination of the first set and the second set of one or more pipe parameter values, the first set being weighted higher than the second set.

6. The method of claim 1, wherein the numerical inversion comprises minimizing a difference between the measured electromagnetic response signals and a reference electromagnetic response signals jointly for portions of the measured electromagnetic response signals including frequencies equal to or above the threshold frequency and below the threshold frequency, respectively, the difference between the measured and reference electromagnetic response signals for the portion of the measured electromagnetic response signals including frequencies below the threshold frequency receiving a lower weight than the difference between the measured and reference electromagnetic response signals for the portion of the measured electromagnetic response signals including frequencies equal to or above the threshold frequency.

7. The method of claim 1, further comprising adjusting the logging speed during the transmitting and measuring based at least in part on a selected one of the frequencies of electromagnetic excitation waves, wherein adjusting the logging speed causes the threshold frequency to not exceed the selected frequency.

8. The method of claim 7, wherein the threshold frequency is selected based at least in part on a total thickness of the one or more pipes at a location of the electromagnetic logging tool.

9. The method of claim 1, wherein weights associated with the measured electromagnetic response signals including frequencies below the threshold frequency correspond to degrees of resolution degradation determined based in part on the spatial resolution associated with the logging tool.

10. The method of claim 1, wherein the threshold frequency is further based on a specified minimum number of signal periods such that the electromagnetic logging tool moves by less than a specified fraction of the spatial resolution during a time period spanning the minimum number of signal periods at the threshold frequency.

11. The method of claim 1, further comprising determining, based on the measured electromagnetic response signals acquired at a first depth of the electromagnetic logging tool within the one or more pipes, a trend of a signal-to-error ratio depending on frequency, and adjusting frequencies of electromagnetic excitation waves for measurement at a second depth based on the trend.

12. The method of claim 11, wherein determining the signal-to-error ratio comprises determining the one or more pipe parameters based on the measured electromagnetic response signals acquired at the first depth, computing modelled electromagnetic response signals for a plurality of frequencies of electromagnetic excitation waves based on the one or more pipe parameters, and determining the signal-to-error ratio based on the modelled electromagnetic response signals.

13. The method of claim 1, further comprising selecting the frequencies of electromagnetic excitation waves separately for each of multiple sections of the one or more pipes.

14. The method of claim 1, further comprising selecting the frequencies of electromagnetic excitation waves based on sensitivities of the one or more pipe parameters to electromagnetic response signals at the frequencies of the initial operating parameters.

15. The method of claim 1, further comprising transmitting electromagnetic excitation waves and measuring electromagnetic response signals at a single low frequency and, in response to determining a change in a total thickness of the one or more pipes from the measured response signals at the single low frequency, reducing the logging speed and transmitting electromagnetic excitation waves and measuring electromagnetic response signals at the frequencies of the initial operating parameters.

16. The method of claim 1, wherein the initial operating parameters are selected based on a depth of penetration needed to reach an outermost pipe of the one or more pipes at a given borehole depth.

17. A system comprising:
an electromagnetic logging tool for disposal interior to one or more pipes within a wellbore, the tool comprising at least one transmitter, at least one receiver, and associated circuitry collectively configured to transmit electromagnetic excitation waves and measure electromagnetic response signals at multiple frequencies;
wherein the electromagnetic logging tool is configured with initial operating parameters for the electromagnetic logging tool, wherein the initial operating parameters include the frequencies of the electromagnetic excitation waves, logging speed, and measurement cycle;
a processing facility configured to:
determine a spatial resolution associated with the logging tool and at least one of the one or more pipes;
determine, based at least in part on a logging speed and a spatial resolution associated with the logging tool and at least one of the one or more pipes, a threshold frequency associated with resolution degradation;
determine one or more pipe parameters of the at least one of the one or more pipes by numerical inversion based on the measured electromagnetic response signals, wherein at least one of the one or more pipe parameters is a thickness of the at least one of the one or more pipes, wherein a portion of the electromagnetic response signals include frequencies equal to or above the threshold frequency being weighted higher than a portion of the electromagnetic response signal that includes frequencies below the threshold frequency; and
adjust at least the frequencies of the electromagnetic excitation waves according to the thickness of the at least one of the one or more pipes.

18. The system of claim 17, wherein the measured electromagnetic response signals comprise multiple electromagnetic response signals at multiple respective frequencies, a portion of the measure electromagnetic response including frequencies equal to or above the threshold frequency being a subset of the multiple electromagnetic response signals that have frequencies equal to or above the threshold frequency.

19. The system of claim 17, wherein the processing facility is configured to weight the measured electromagnetic response signals including frequencies below the threshold frequency by zero.

20. A non-transitory computer-readable medium storing processor-executable instructions which, when executed by one or more processors, cause the one or more processors to:
receive initial operating parameters for an electromagnetic logging tool inserted into one or more pipes within a wellbore, wherein the initial operating parameters include frequencies of electromagnetic excitation waves, logging speed, and measurement cycle;
receive electromagnetic response signals measured by the electromagnetic logging tool responsive to electromagnetic excitation waves transmitted by the electromagnetic logging tool as the electromagnetic logging tool moves through the wellbore;
receive logging-speed data associated with the electromagnetic response signals;
determine, based at least in part on the logging-speed data, a threshold frequency associated with resolution degradation; and
determine one or more pipe parameters of the one or more pipes by numerical inversion based at least in part on one or more of the received electromagnetic response signals that have frequencies equal to or above the threshold frequency, processed separately and weighted higher than electromagnetic response signals having frequencies below the threshold frequency, wherein at least one of the one or more pipe parameters is a thickness of the at least one of the one or more pipes; and
adjust at least the frequencies of the electromagnetic excitation waves according to the thickness of the at least one of the one or more pipes.

21. The computer-readable medium of claim 20, wherein the received electromagnetic response signals include multiple electromagnetic response signals at multiple respective frequencies, a portion of the electromagnetic response signals including frequencies equal to or above the threshold frequency being a subset of the multiple electromagnetic response signals that have frequencies equal to or above the threshold frequency.

* * * * *